May 7, 1935.  H. H. FRICK  2,000,834
POWER TRANSMISSION WHEEL
Filed June 21, 1930   3 Sheets-Sheet 2
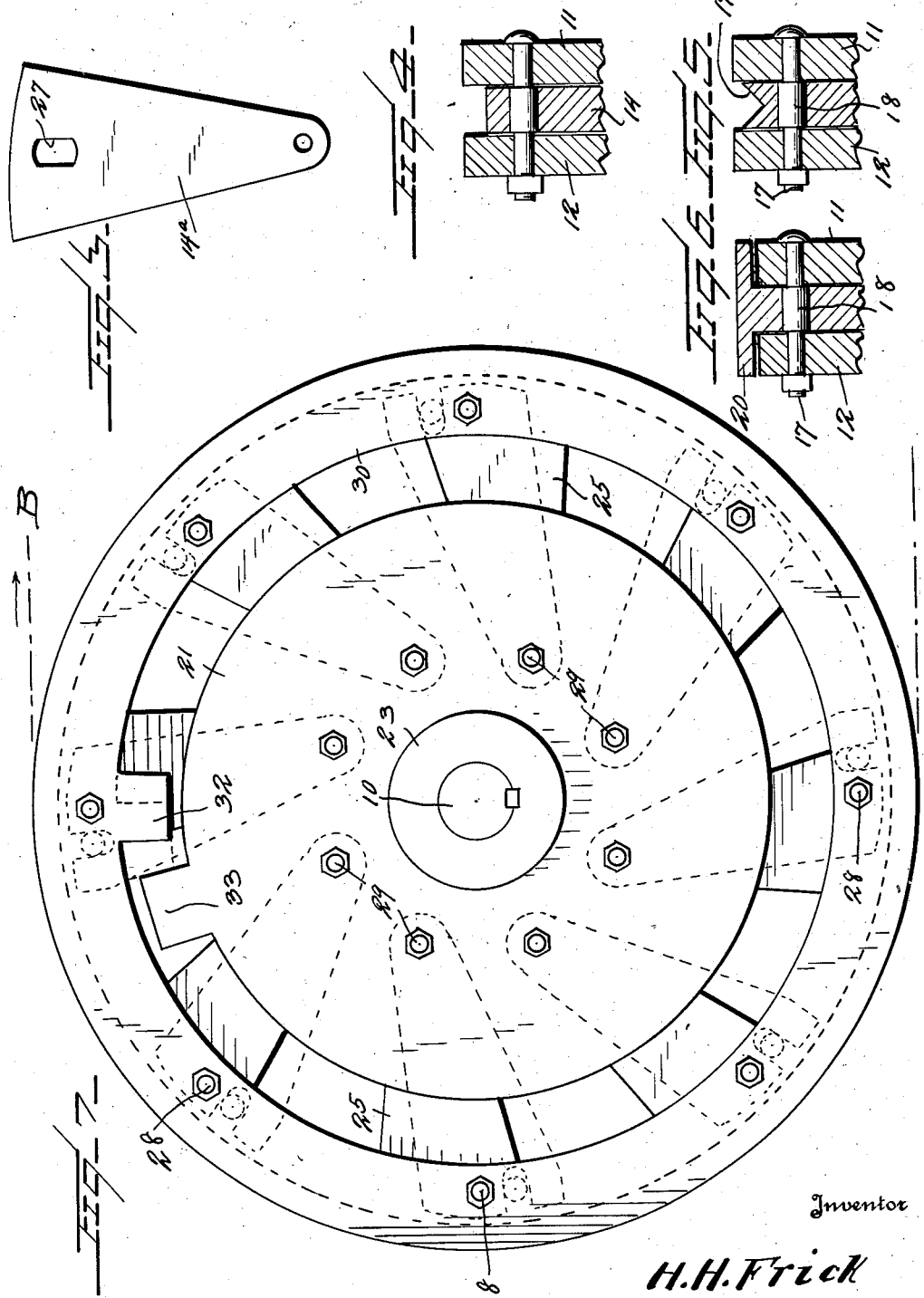
Inventor
H. H. Frick
By Watson E. Coleman
Attorney May 7, 1935. H. H. FRICK 2,000,834
POWER TRANSMISSION WHEEL
Filed June 21, 1930 3 Sheets-Sheet 3
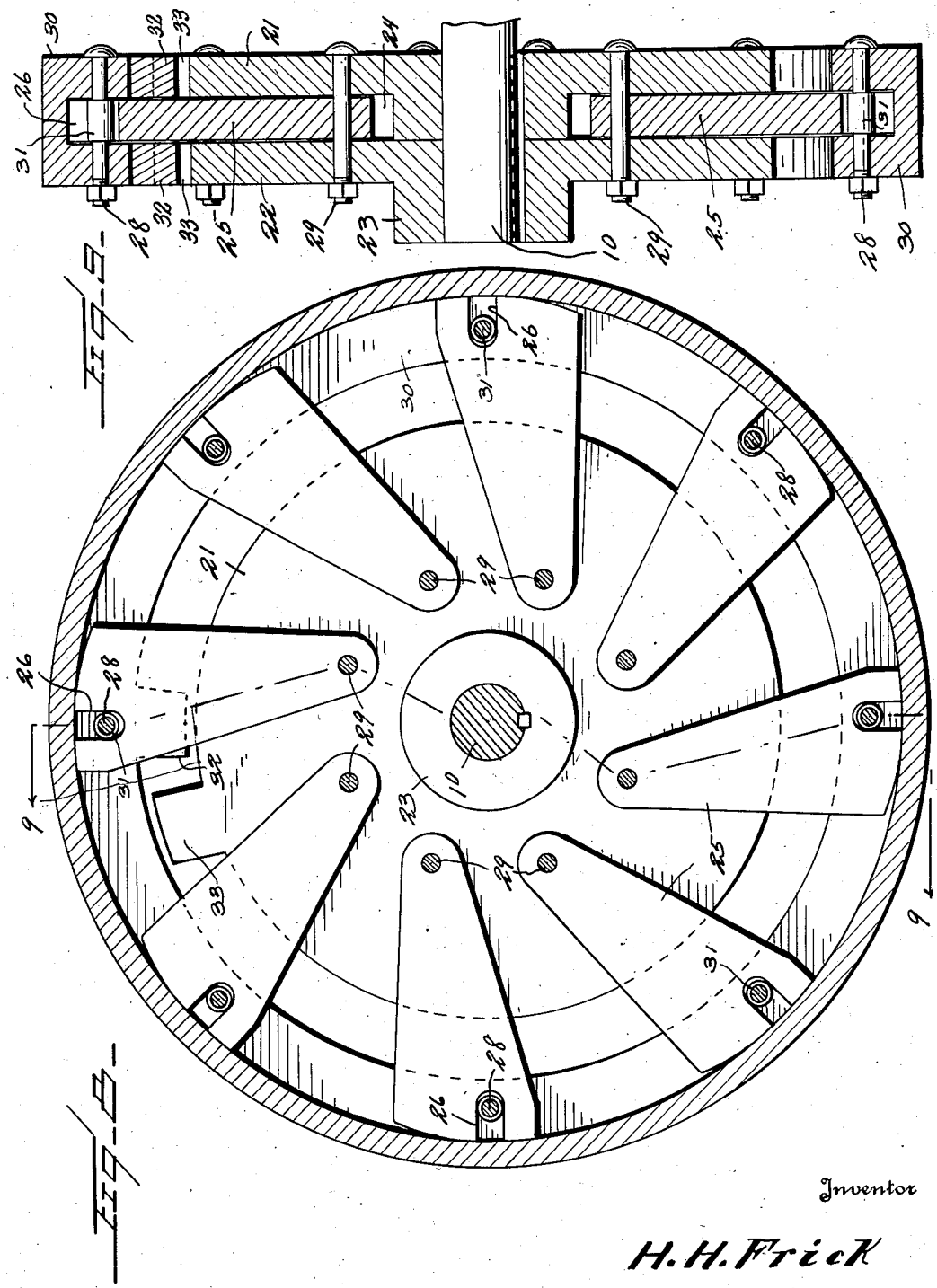
Inventor
H. H. Frick
By Watson E. Coleman
Attorney Patented May 7, 1935

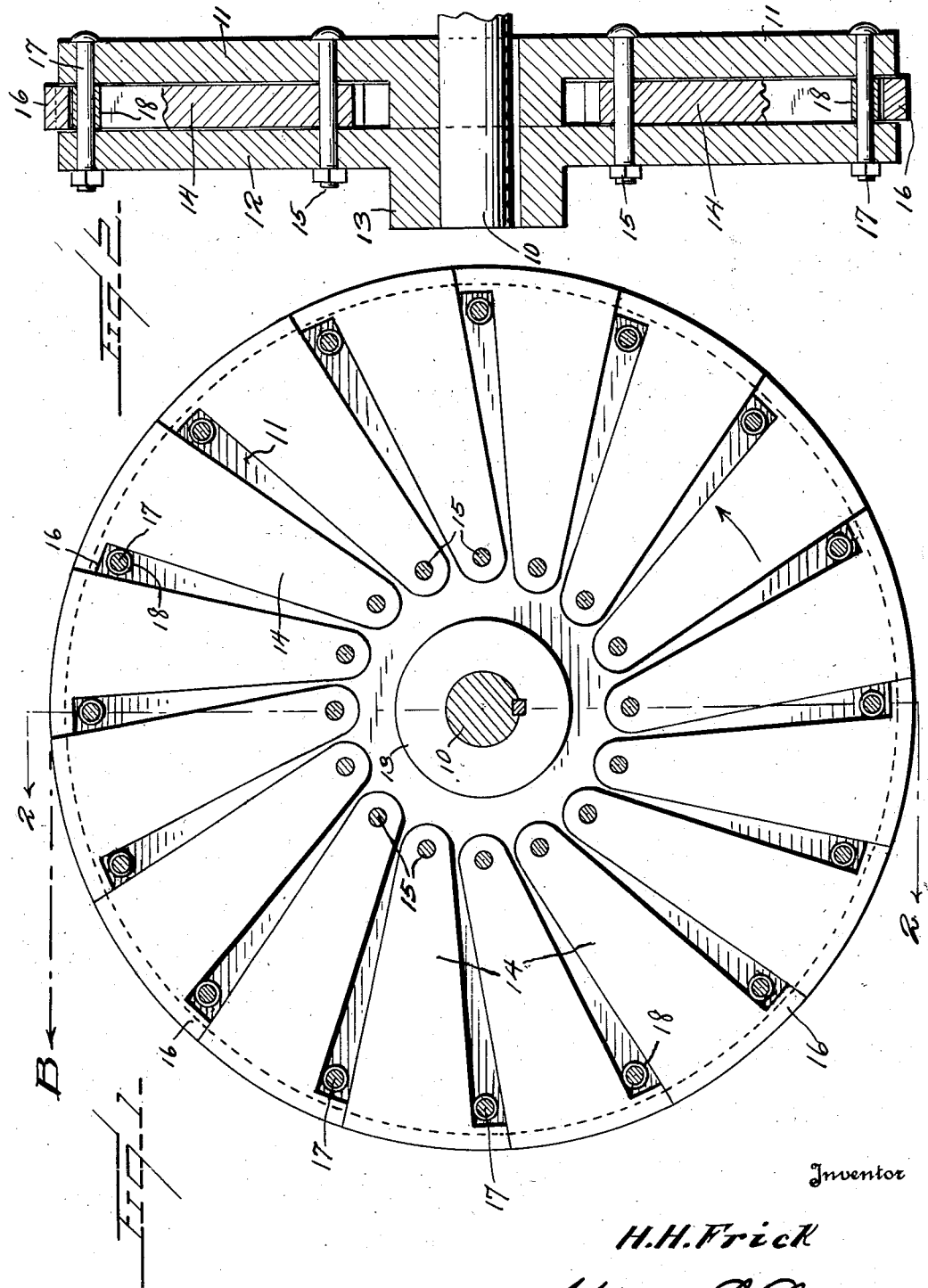

2,000,834

UNITED STATES PATENT OFFICE 2,000,834

POWER TRANSMISSION WHEEL

Henry H. Frick, Fricks, Pa.

Application June 21, 1930, Serial No. 462,873

4 Claims. (Cl. 74—230.1)

This invention relates to power transmission wheels, whether sprocket wheels, gear wheels, band wheels, or other wheels whereby power is transmitted to or from a shaft, and the general object of the invention is to so form the wheel as to secure a better application of power either to the wheel or as given off therefrom.

My invention is illustrated in the accompanying drawings, wherein:—

Figure 1 is a side elevation of one form of my wheel with one of the side plates removed;

Figure 2 is a sectional view on the line 2—2 of Figure 1 both of the side plates being in place;

Figure 3 is a face view of a modified form of arm or spoke;

Figures 4, 5 and 6 are fragmentary sections on the same lines as Figure 2, but showing slight variations in the formation of the wheel;

Figure 7 is a side elevation of a modified form of wheel showing in full and dotted lines two positions of the wheel rim;

Figure 8 is a vertical sectional view through the wheel shown in Figure 7;

Figure 9 is a section on the line 9—9 of Figure 8.

Referring now to Figures 1 and 2, 10 designates a shaft. Disposed upon the shaft are the two lateral disks 11 and 12, each having a hub 13, these hubs being keyed upon the shaft 10 so as to rotate therewith. The disks 11 are spaced apart as shown clearly in Figure 2 and inserted in these spaces are a plurality of arms or spokes 14, each increasing in width circumferentially toward the rim of the wheel and as illustrated in Figure 2 projecting slightly beyond the perimeter of the disks 11 and 12. Each of these arms or spokes 14 is pivoted upon its inner end upon a corresponding bolt 15 which passes through the disks 11 and 12 at a point adjacent the hub. The outer end of each spoke or arm 14 at one end of its perimeter is extended to form the lug or extension 16 and disposed through the disks 11 and 12 and disposed immediately beneath each extension 16 is a bolt 17 carrying a roller 18 with which the extension has rolling contact. In practice there is clearance of approximately one-sixteenth of an inch between the inner faces of the lug 16 and the peripheral faces of the rollers 18 and a clearance of approximately one-thirty-second of an inch between each roller 18 and the edge face of the spoke 11 in advance of the roller. From Figure 1, it will be noted that the bolts 17 are so placed that the spokes or arms 14 are held in tangential relation to the hub or to a circle concentric to the hub.

It will be obvious that the perimeter of the spokes or arms 14 which constitute part of the wheel may have different forms. These different forms are indicated in Figures 4 to 6.

Thus in Figure 2, the ends of the spokes or arms, which constitute the working face of the wheel, project beyond the peripheries of the side pieces 11 and 12. In Figure 4, the arms are lessened in length so that a recess is formed between the side pieces 12 and 11. In Figure 5, each of the arms at its outer end is grooved as at 19 for the reception of a belt. In Figure 6, each of the arms is T-shaped in cross section to provide a head 20 which may extend over the peripheral edges of the side pieces 11 and 12. The outer end faces of the arms may be formed with sprocket teeth or gear teeth, if desired.

The face of the T-shaped portion 20 in Figure 6 thus may be provided with sprocket teeth or with gear teeth or may be left plain to receive a belt. The same is true of the recessed faces shown in Figure 4 or the projected faces of these arms as shown in Figure 2. Thus a belt, sprocket wheel or a gear wheel may have driving engagement with the wheel either by means of direct meshing of the gear teeth or by belts or sprocket chains.

In Figures 7, 8 and 9, I have shown another form of my invention, using fewer spokes or arms and thus being lighter in construction. In this case, as shown in Figures 8 and 9, the shaft 10 carries upon it the two side pieces 21 and 22, each having hubs 23 and spaced from each other to provide the space 24. Disposed within this space 24 are a plurality of arms or spokes 25 shown in Figure 8 as eight in number, though any number may be used. These spokes as illustrated are formed with slots 26 extending radially outward and opening upon the outer end faces of the spokes or the spokes might be formed as shown in Figure 3 where the spoke 14ᵃ is illustrated as being formed with a radial slot 27 adjacent the outer end of the spoke.

This slot (26 or 27) is for the reception of a transverse bolt such as the bolt 17 in Figure 1 or a bolt such as the bolt 28 in Figure 8. In Figure 8, there are a plurality of bolts 28 passing through the slots 26 while pivot bolts 29 pass through the inner ends of the spokes or arms 25 and through the two side pieces 21 and 22 holding these side pieces in engaged relation. The bolts 28 in Figure 8 pass through the slots 26 and through a rim member 30 which is approximately U-shaped in cross section as shown in Figure 9. The middle portion of each of these bolts carries upon it the roller 31 which bears against the walls of the corresponding slot 26. In order to limit the movement of the arms or spokes 25 in one direction, the rim 30 is formed on its side walls with an inwardly projecting stop lug 32 and each of the disks 21 is formed with an outwardly projecting stop lug 33, these stop lugs being disposed adjacent each other as shown in Figure 8. When the arms 25 swing toward the right in Figure 8, they will engage against the rim of the wheel, and, therefore, this rim will prevent further movement in this direction of these arms 25. Thus the arms 25 will be limited in their movement in this direction. The movement of the arms 25 toward the left in Figure 8 will be limited by the engagement of the stops 32 and 33, the slots 26 permitting this movement of the rim. In Figure 1, the arms 14 are held in their tangential position by reason of engagement with each other, but the arms as a whole are held from movement out of a tangential position relative to the center of rotation of the shaft 10 by means of the bolts 17.

In Figure 1, if the wheel or pulley is driven in a counter-clockwise direction, and a belt be applied to the pulley, the belt B running in the direction illustrated, the force will then be transmitted from the shaft 10 to the periphery of the wheel or pulley and thus to the belt.

The action will tend to force the arms 14 outward thus increasing the tractive engagement between the wheel and the belt or sprocket chain passing thereover. The same action will take place if, in Figure 1, the belt is disposed reversely to the direction illustrated and operated to drive the wheel in a clockwise direction then the tight run of the belt will cause the arms 14 to move on their pivots but enough to tighten up on the belt.

If power be applied to the belt B in Figure 7 to rotate the wheel shown in Figure 7 in a clockwise direction, the arms will be turned upon their pivots in the position shown in Figure 8 and will act to shift the rim from a position of eccentricity to a position of concentricity to thus tighten up on the belt and increase tractive engagement.

If the wheel shown in Figures 7 and 8 is used as a driving medium and turns in a counter-clockwise direction with the belt extending as shown in Figure 7, the rim will be shifted from an eccentric position to a concentric position, lugs 32 and 33 will separate until the arms 25 swing out and engage the rim 30, thus increasing the tractive engagement between the belt and wheel.

While I have illustrated certain constructions which I have found to be particularly effective, it is obvious that the principle of my invention might be applied in many ways without departing from the spirit of the invention as defined in the appended claims.

I claim:—

1. A power transmission wheel having a hub, the hub including two spaced plates, a plurality of arms disposd between said plates and having their inner ends pivoted to said plates, the arms extending tangentially with reference to a circle concentric to the hub, a U-shaped rim embracing the ends of the arms, bolts passing through the rim, the ends of the arms being slotted to receive said bolts, the rim having an inwardly projecting lug and one of the plates having an outwardly projecting lug confronting the lug on the rim and limiting the movement of the arms in one direction, the rim acting to limit the movement of the arms in another direction.

2. A power transmission unit having a hub including spaced plates concentric to the hub, tangential arms disposed between the plates, each arm gradually increasing in width from the inner end of the arm outward and the arms projecting beyond the plates, bolts passing through the plates and pivotally supporting the inner ends of said arms, a rim surrounding the extremities of the arms and against which the extremities of the arms bear, the rim being U-shaped in cross section to embrace the arms, bolts passing transversely through the rim, the arms being longitudinally slotted to receive said bolts, and the ends of the arms being rounded to rockingly engage the rim, each of the plates being provided with an outwardly projecting lug and the rim being provided with inwardly projecting lugs confronting the first named lugs, said lugs limiting the movement of the arms in one direction and the rim acting to limiting the movement of the arms in a direction out of their tangential position.

3. A power transmission wheel having a hub, the hub including two laterally spaced plates, a plurality of arms, each pivoted at its inner end between said plates, the arms extending tangentially to a circle concentric to the hub, a rim operatively connected to the arms for peripheral movement relative to the hub and from a position of eccentricity to a position of concentricity of the hub, and means limiting the movement of the arms in a direction away from a radial position including coacting lugs on the rim and hub, the movement of the arms toward a radial position being limited by engagement of the ends of the arms with the rim.

4. In a power transmission wheel having a hub including two spaced plates concentric to the hub, a plurality of arms disposed between said plates, the arms gradually increasing in width from the inner end of the arms outward, the arms being disposed in a tangential position with reference to a circle concentric to the center of the hub, bolts passing through the plates and inner ends of said arms, a rim having flanges extending inward on each side of the outer ends of the arms, guide bolts passing through said flanges adjacent the periphery of the rim and through the spaces between said arms, the arms loosely engaging said bolts at both edges, each arm having a circumferentially extending portion extending over said bolts, said guide bolts being provided with rollers.

HENRY H. FRICK.